United States Patent
Reuter et al.

(12) 
(10) Patent No.: US 6,386,842 B1
(45) Date of Patent: May 14, 2002

(54) LOW COST, SINGLE STROKE, ELECTROMAGNETIC PRE-CHARGE PUMP FOR CONTROLLED BRAKE SYSTEMS

(75) Inventors: David Fredrick Reuter, Beavercreek; E. Wayne Lloyd, Lebanon; James A. Bright, Dayton, all of OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/771,461

(22) Filed: Jan. 26, 2001

(51) Int. Cl.[7] ............................................. F04B 35/04
(52) U.S. Cl. ...................................................... 417/417
(58) Field of Search ................................. 417/417, 416, 417/307; 303/10, 11

(56) References Cited

U.S. PATENT DOCUMENTS 4,543,789 A * 10/1985 Norton ........................ 303/10
5,340,288 A * 8/1994 Mikiya et al. ............... 417/417
5,509,729 A * 4/1996 Zaviska et al. ........... 303/115.4
5,797,733 A * 8/1998 Falk et al. ................... 417/307
5,826,952 A * 10/1998 Feigel et al. .............. 303/113.2
6,142,583 A * 11/2000 Steffes ....................... 303/113.4
6,220,675 B1 * 4/2001 Steffes ........................... 303/11

* cited by examiner

Primary Examiner—Teresa Walberg
Assistant Examiner—Vinod Patel
(74) Attorney, Agent, or Firm—Scott A. McBain

(57) ABSTRACT

A fluid pump assembly for pumping hydraulic fluid through a controlled brake system includes a housing defining a pumping chamber. The chamber communicates with a hydraulic fluid circuit that operates the controlled brake system. A piston plunger is disposed within the chamber with a shaft affixed to the plunger. An electric coil is affixed to a casing having the shaft inserted therethrough. The coil is coaxially aligned with the shaft. The coil generates a magnetic field through an armature affixed to a distal end of the shaft disposed outside the chamber when receiving electrical current. The magnetic field draws the armature towards the casing for pumping hydraulic fluid from the chamber.

23 Claims, 3 Drawing Sheets

US 6,386,842 B1

LOW COST, SINGLE STROKE, ELECTROMAGNETIC PRE-CHARGE PUMP FOR CONTROLLED BRAKE SYSTEMS

TECHNICAL FIELD

The subject invention relates generally to an improved precharge pump for use with a controlled brake system.

BACKGROUND OF THE INVENTION

Motor vehicle brakes that are interfaced with a controlled brake system are presently operated with hydraulic fluid. A master cylinder/booster distributes hydraulic fluid throughout the brake system as is well known in the art of hydraulic vehicle braking. Two separate feed lines transfer hydraulic fluid from the master cylinder to the driver's side and passenger's side brakes through a series of valves that are opened and closed by a controller. The controller determines which valves to open and close based on information obtained from sensors on the vehicle such as, for example, brake sensors, speed sensors, and yaw rate sensors.

The passenger's side and the driver's side hydraulic lines each include a main hydraulic pump for increasing hydraulic pressure in the hydraulic lines during a braking event. The appropriate valves either open or close depending upon whether a brake pedal is being depressed, or has been released. When the controller determines a controlled braking event is about to occur, it signals the main hydraulic pumps to rapidly increase pressure in the hydraulic lines for the valves to distribute hydraulic fluid to the appropriate brakes. However, the master cylinder alone has been found to be unable to supply enough hydraulic fluid to the main pumps to allow the main pumps to rapidly increase fluid pressure in the hydraulic lines. If the main pumps are not able to rapidly increase fluid pressure to the appropriate brakes, the effectiveness of the controlled brake system is significantly reduced. Therefore, a precharge pump is needed to rapidly supply additional hydraulic fluid to both the master cylinder and to the main pumps when signaled by the controller.

The precharge pump typically strokes one time when signaled by the controller that a controlled braking event is about to occur. This provides additional hydraulic fluid to the main pumps allowing the main pumps to rapidly increase fluid pressure to the valves. Complex gerotor or vane type pumps are often used for this type of application. These types of pumps have proven to be very costly and have not offered the reliability necessary to meet the requirements of the controlled brake assembly. Therefore, it would be desirable to introduce a low cost, mechanically simple pump to the controlled brake system for increasing the amount of hydraulic fluid to the main pumps to operate a controlled braking event.

SUMMARY OF THE INVENTION

The present invention is a precharge fluid pump for pumping hydraulic fluid through a controlled brake system. A housing defines a chamber that communicates with a hydraulic fluid circuit. A casing is fixedly attached to the housing and has an aperture aligned coaxially with the chamber. A piston includes a plunger slideably disposed within the chamber. A shaft is affixed to the plunger and has a distal end extending through the aperture. An armature is affixed to the distal end of the shaft. A coil is affixed to the casing and is arranged coaxially with the shaft. The coil generates a magnetic field through the armature when receiving an electrical current. The magnetic field draws the armature towards the casing driving the piston into the chamber for pumping hydraulic fluid. A spring biases the armature away from the casing in the absence of the magnetic field.

By using a magnet field to draw a piston into a pumping chamber for pumping hydraulic fluid into the hydraulic fluid circuit reduces the cost of the precharge pump. Further, this concept reduces the amount of moving parts commonly needed in a precharge pump, which increases the dependability of the controlled brake system.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
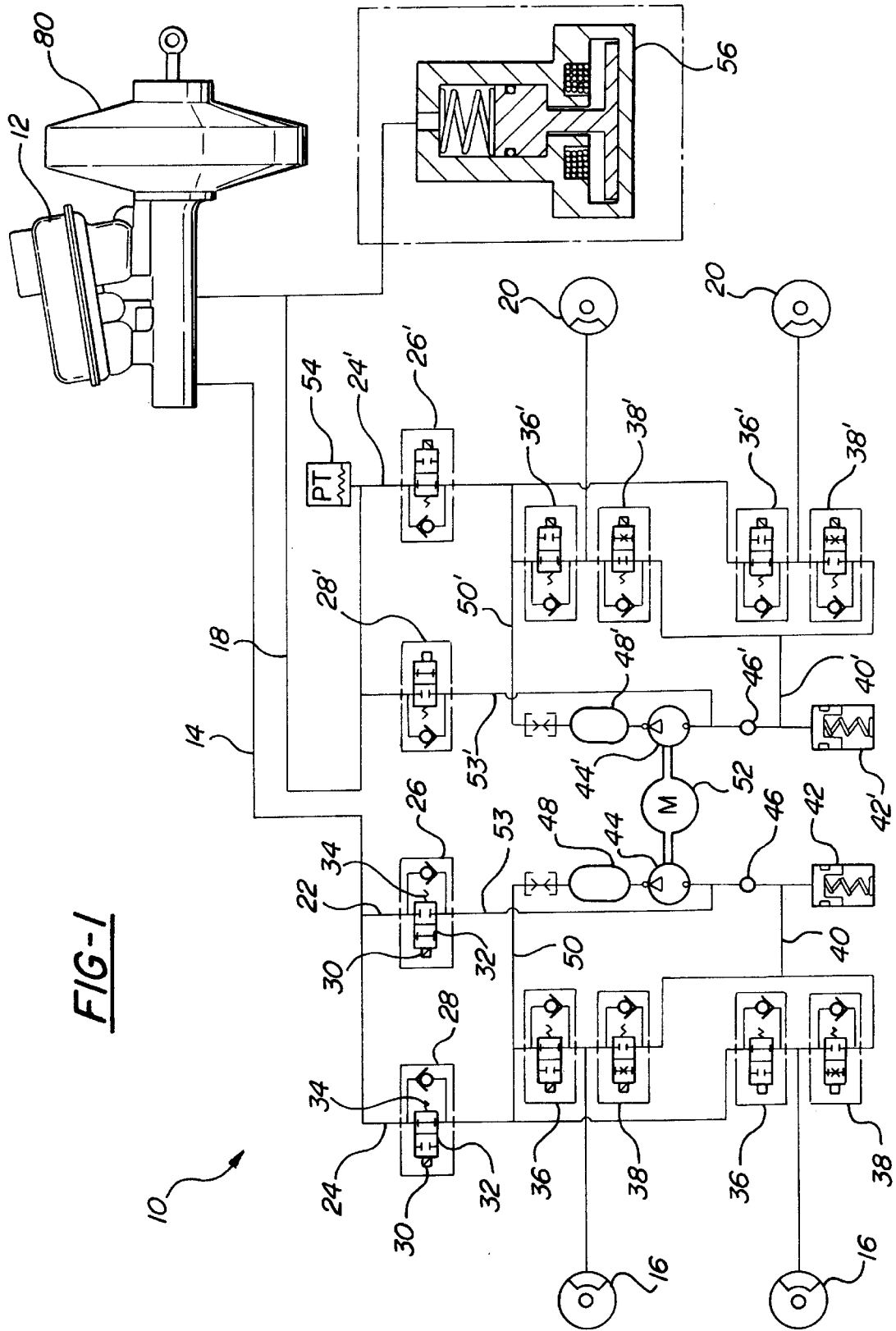
FIG. 1 is a schematic view to the controlled braking system.

Referring to FIG. 1, a controlled brake assembly is generally shown at 10. The controlled brake assembly 10 includes a master cylinder 12 that controls the distribution of hydraulic fluid throughout the assembly 10. A driver's side feed line 14 delivers hydraulic fluid from the master cylinder 12 to the driver's side brakes 16. A passenger's side feed line 18 delivers hydraulic fluid from the master cylinder 12 to the passenger's side brakes 20. The driver's side of the assembly 10 generally mirrors the passenger's side of the assembly as is known in the art of vehicle braking.

The driver's side feed line 14 branches first to a closed valve line 22 and subsequently to an open valve line 24. The closed valve line 22 includes a closed valve 26 biased in a closed position. The open valve line 24 includes an open valve 28 biased in an open position.

As is known in the art of hydraulic valving, each valve 26, 28 includes an electric coil 30 that communicates with a controller (not shown). A solenoid valve 32 is disposed within each of the valves 24, 26 and is actuated by the electric coil 30. A spring 34 maintains the solenoid valve 32 in the biased direction, whether that is open or closed. Each of the valves discussed below includes the same elements and, therefore, will not be discussed in any further detail.

The open valve line 24 feeds each of the driver's side brakes 16 through an inlet valve 36. Downstream from each inlet valve 36 is an outlet valve 38. Each inlet valve 36 is biased in an open direction allowing the hydraulic fluid to pass through to each of the driver's side brakes 16. Each outlet valve 38 is biased in a closed direction and, therefore, prevents the hydraulic fluid from bypassing the driver's side brakes 16 when the inlet valves 36 are biased in the open direction. Therefore, when the inlet valve 36 is open and the outlet valve 38 is closed, hydraulic fluid is delivered to the brake at a pressure high enough to actuate the brake 16.

Each outlet valve 38 feeds into a main pump feed line 40. A spring-loaded accumulator 42 is connected to the main pump feed line 40. A driver's side main pump 44 is disposed in the main pump feed line 40. The spring loaded accumulator 42 collects hydraulic fluid to provide additional hydraulic fluid to the driver's side pump 44 when needed. A pump piston 46 is disposed between the driver's side main pump 44 and the spring loaded accumulator 42. The driver's side main pump 44 pumps hydraulic fluid via the piston 46 through a damping chamber 48 into a high pressure hydraulic line 50. The high pressure hydraulic line 50 returns hydraulic fluid to each of the driver's side inlet valves 36. A pump motor 52 powers the driver's side main pump 44.

Referring now to the passenger's side, the passenger's side feed line 18 preferably includes a pressure sensor 54 in an open valve line 24' that detects the pressure in the passenger's side feed line 18 derived from the pressure exerted on a brake pedal. The pressure sensor 54 can alternatively be located in the driver's side feed line 14. The passenger's side brakes 20 utilize parallel apparatus as the driver's side apparatus as will be evident in the text below.

The passenger's side open valve line 24' feeds each of the passenger's side brakes 20 through an inlet valve 36'. Downstream from the inlet valves 36' are outlet valves 38'. The inlet valves 36' are biased in an open direction allowing the hydraulic fluid to pass through to each of the passenger's side brakes 20. The outlet valves 38' are biased in a closed direction and therefore prevent the hydraulic fluid from bypassing the passenger's side brakes 20 when the inlet valves 36' are biased in the open direction.

The outlet valves 38' feed into a main pump feed line 40'. A spring-loaded accumulator 42' is connected to the main pump feed line 40. A passenger's side main pump 44' is disposed in the main pump feed line 40'. The spring loaded accumulator 42' collects hydraulic fluid to provide additional hydraulic fluid to the passenger's side pump 44' when needed. A pump piston 46' is disposed between the passenger's side pump 44' and the spring loaded accumulator 42'. The passenger's side main pump 44' pumps hydraulic fluid through a damping chamber 48' into a high pressure hydraulic line 50'. The high pressure hydraulic line 50' returns hydraulic fluid to each of the driver's side inlet valves 36'. The pump motor 52 that powers the driver's side main pump 44 also powers the passenger's side main pump 44'. Therefore, when the inlet valve 36' is open and the outlet valve 38' is closed, hydraulic fluid is delivered to the brake at a pressure high enough to actuate the brake 20.

Figure 2:
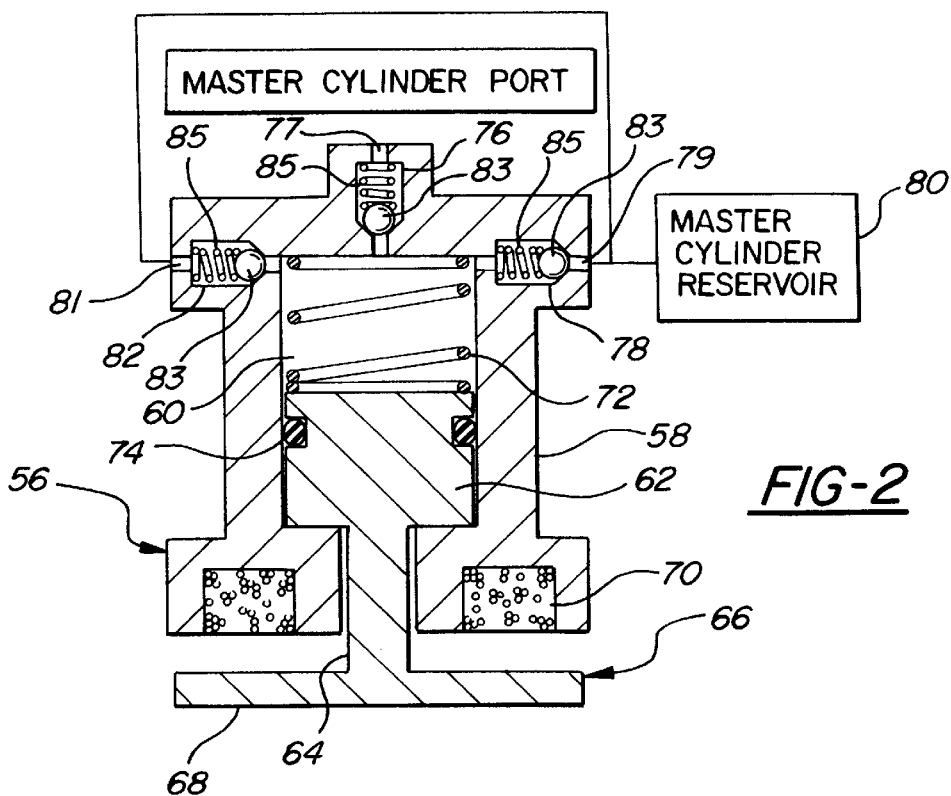
FIG. 2 is a sectional view of the inventive pump of the preferred embodiment.

An electromagnetic pump assembly 56 communicates with the passenger's side feed line 18. The pump assembly 56 increases the hydraulic fluid pressure in the master cylinder 12 and in the hydraulic circuit in general. During a controlled braking event, the brakes 16, 20 are repeatedly actuated by the controller to prevent the loss of vehicle control. To obtain a rapid reaction time, the magnetic pump assembly 56 increases the supply of hydraulic fluid to the main pumps 44, 44'. Absent this additional pressure, the main pumps 44, 44' could cavitate resulting in a response time that is inadequate to maintain control of the vehicle. The magnetic pump assembly 56 typically strokes one time when signaled by the controller that a controlled braking event is occurring. This single stroke provides enough hydraulic fluid pressure to both the master cylinder 12 and the passenger's side feed line 18 to supply an adequate amount of hydraulic fluid to both the driver's side main pump 44 and the passenger's side main pump 44'. Referring to FIG. 2, the magnetic pump assembly 56 includes a pump housing 58 that defines a pumping chamber 60. A piston 62 is slidably retained in the pumping chamber 60. A piston shaft 64 is affixed to the piston 62 and includes a distal shaft end 66 that telescopes out of the housing 58. An armature 68 is affixed to the distal shaft end 66. An electrical coil 70 is affixed to the housing coaxially with the piston shaft 64. A spring 72 is disposed in the pumping chamber 60 and biases the armature 68 away from the housing 58. An O-ring 74 encircles the piston 62 thereby sealing the piston 62 to the housing 58 for preventing hydraulic fluid from leaking past the piston 62 and out of the housing 58.

Hydraulic fluid is pumped through an outlet check valve 76 in an outlet port 77 and into the passenger's side feed line 18 from the pumping chamber 60. The outlet check valve 76 prevents hydraulic fluid from reentering the pumping chamber 60 from the passenger's side feed line 18. Hydraulic fluid passes through an inlet check valve 78 in an inlet port 79 from a master cylinder reservoir 80 into the pumping chamber 60 when a vacuum is created in the pumping chamber 60 by the telescoping action of the piston 62. The inlet check valve 78 prevents hydraulic fluid from leaving the pumping chamber 60 and reentering the master cylinder reservoir 80. A pressure relief valve 82 in a pressure relief port 81 allows hydraulic fluid to pass from the pumping chamber 60 into the master cylinder reservoir 80 only if hydraulic pressure in the pumping chamber 60 reaches a critical level. Hydraulic fluid will be returned through the pressure relief valve 82 to the master cylinder reservoir 80 to prevent damaging the master cylinder 12 due to critically high levels of hydraulic pressure. Each of the valves 76, 78, 82 preferably include a ball 83 and spring 85 biasing the ball to close the port 77, 79, 81. However, other types of check valves would be equally effective.

During operation, a controller (not shown) will receive information from both the pressure sensor 54 and other sensors (not shown) such as, for example, brake sensors, speed sensors, and yaw rate sensors. The controller will determine if a controlled braking event is about to occur. Subsequent to that determination, the electric coils 70 will be charged to create a magnetic flux path. The magnetic flux will draw the armature 68 towards the electric coil 70 driving the piston 62 into the pumping chamber 60. The driving action increases hydraulic fluid pressure inside the pumping chamber 60 forcing hydraulic fluid out through the outlet check valve 76 towards both the master cylinder 12 and the passenger's side feed line 18. The increased amount of hydraulic fluid in the assembly 10 will provide a sufficient amount of hydraulic fluid to the driver's and passenger's side main pumps 44, 44' to actuate each of the brakes 16, 20 in a timely manner. Absent this additional hydraulic fluid, the main pumps 44, 44' potentially will not have enough hydraulic fluid to actuate the brakes 16, 20 in a timely manner. Thus, the controlled braking assembly 10 would not provide an adequate amount of wheel control to prevent a loss of traction with the pavement.

Figure 3:
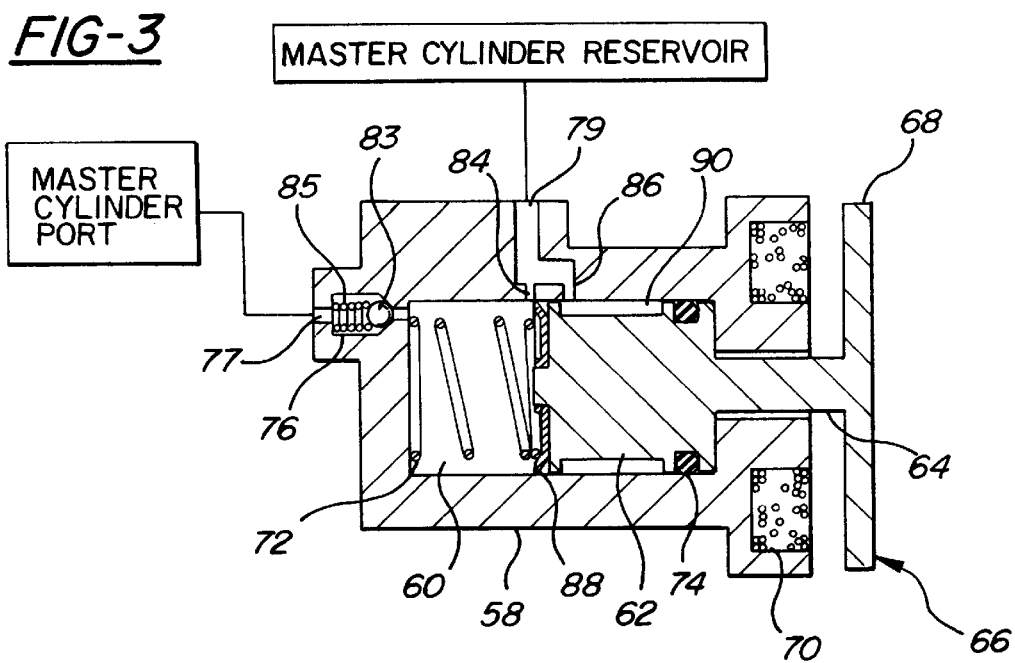
FIG. 3 is a sectional view of an alternate embodiment of the inventive pump.

An alternative embodiment for the magnetic pump assembly 56 is shown in FIG. 3. The alternate magnetic pump assembly 56 draws fluid into the pumping chamber 60 through a bypass port 84 and a compensation port 86. The bypass port 84 and the compensation port 86 merge to draw fluid from the master cylinder reservoir 80. A lip seal 88 is disposed upon the end of the piston 62. The lip seal 88 seals the bypass port 84 from the compensation port 86 when disposed therebetween. When the piston 62 is stroking into the pumping chamber 60, hydraulic fluid will be pumped out of the pumping chamber 60 through the outlet check valve 76. A small amount of hydraulic fluid will also be pumped into the bypass port 84 and flow through the compensation port 86 filling the space in the pumping chamber 60 defined by a groove 90 in the piston 62. When the piston 62 stroke creates a vacuum in the pumping chamber 60, and the lip seal 88 is disposed between the bypass port 84 and the compensation port 86, hydraulic fluid will be drawn from the space created by the groove 90 through the compensation port 86 and into the pumping chamber 60 via the bypass port 84. This insures that the pumping chamber 60 will maintain a prime and prevents the alternate pump assembly 56 from cavitating.

Figure 4:
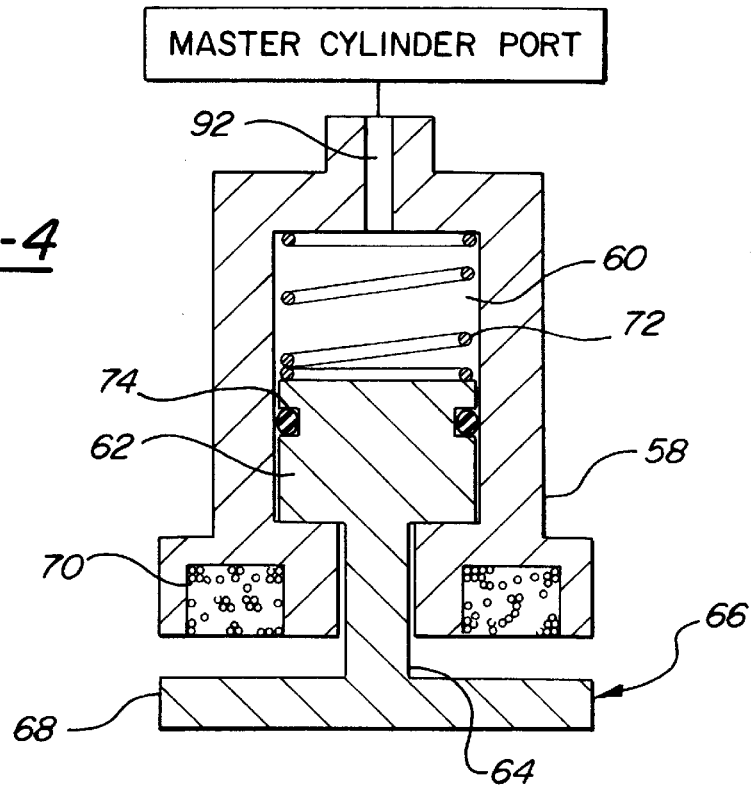
FIG. 4 is a sectional view of a further alternate embodiment of the inventive pump.

An additional alternate embodiment of the magnetic pump assembly 56 is shown in FIG. 4. In this embodiment, the magnetic pump assembly 56 does not include any check valves and is therefore less costly than the other embodiments. A fluid passage 92 connects through the passenger's side feed line 18 to the master cylinder 12. The stroking action of the piston 62 can both draw fluid from the master cylinder 12 and force fluid into the master cylinder 12 depending on the direction of the piston 62 stroke. In this embodiment, a single inward stroke of the piston 62 will increase fluid pressure in the master cylinder 12 and the passenger's side feed line 18. No additional piston strokes are directed by the controller while the same controlled braking event is occurring.

Figure 5:
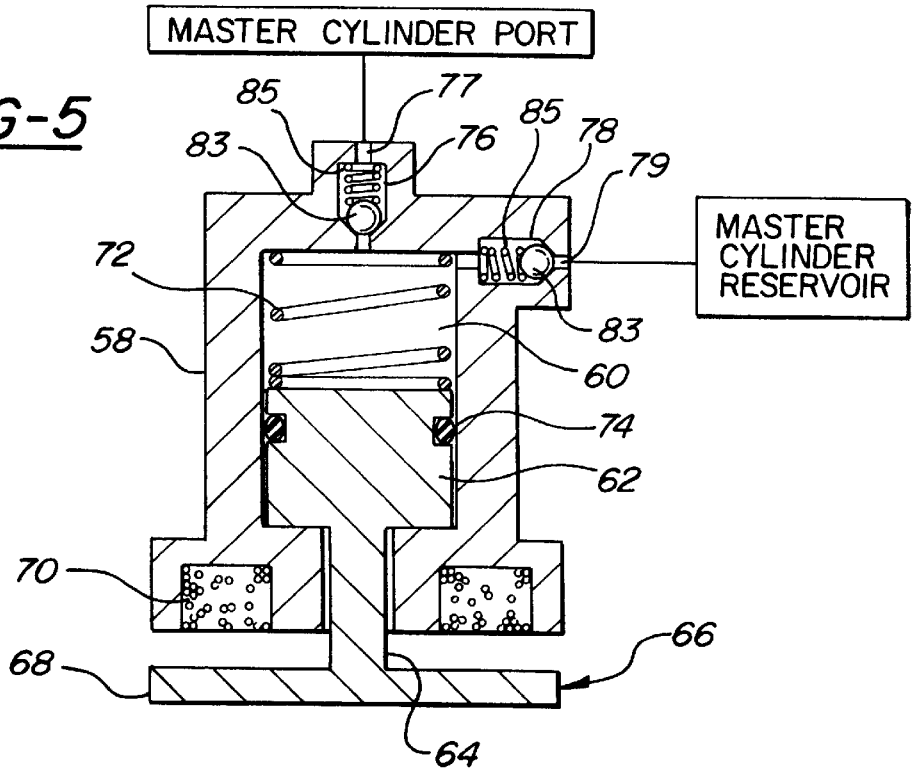
FIG. 5 is a sectional view of a still further alternate embodiment of the inventive pump.

A fourth alternate embodiment of the magnetic pump assembly 56 is shown in FIG. 5. This embodiment includes a single inlet check valve 78 and a single outlet check valve 76. As in the prior embodiments, hydraulic fluid is drawn through the inlet check valve 78 from the master cylinder reservoir 80. Hydraulic fluid is pumped through the outlet check valve 76 into the passenger's side feed line 18 and through to the master cylinder 12 and the passenger's side feed line 14.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A fluid pump assembly for pumping hydraulic fluid through a controlled brake system comprising:
   a housing defining a chamber communicating with a hydraulic fluid circuit;
   a piston having a plunger disposed within said chamber and a shaft affixed to said plunger with a distal end disposed outside said casing;
   an armature affixed to said distal end; and
   a coil affixed to said housing coaxially aligned with said shaft wherein said coil generates a magnetic field through said armature when receiving electrical current thereby drawing said armature towards said casing for pumping hydraulic fluid from said chamber.

2. An assembly as set forth in claim 1 wherein said chamber includes a spring biasing said armature away from said casing.

3. An assembly as set forth in claim 1 wherein said chamber includes at least one outlet port.

4. An assembly as set forth in claim 3 wherein said at least one outlet port includes an outlet check valve for preventing fluid from entering said chamber through said outlet port.

5. An assembly as set forth in claim 4 wherein said chamber includes at least one inlet port.

6. An assembly as set forth in claim 5 wherein said at least one inlet port includes an inlet check valve for preventing fluid from exiting said chamber through said inlet port.

7. An assembly as set forth in claim 5 wherein said inlet port feeds into said chamber through a bypass port and a compensation port, said bypass port being closer to said outlet port than said compensation port.

8. An assembly as set forth in claim 7 wherein said piston includes a washer disposed upon said plunger sealing said chamber for preventing the fluid from leaking past said plunger.

9. An assembly as set forth in claim 8 wherein said piston includes a channel circumscribing said plunger for receiving fluid from said compensation port.

10. An assembly as set forth in claim 1 wherein said plunger includes a seal for preventing fluid from leaking through said aperture out of said hydraulic fluid circuit.

11. A fluid pump assembly for pumping hydraulic fluid through a controlled brake system comprising:
    a pumping chamber;
    a piston having a plunger slideably disposed within said pumping chamber biased in a first direction;
    an armature affixed to said piston;
    an electric coil affixed to said pump capable of generating a magnetic field upon said armature thereby counter-biasing said piston is a second direction.

12. An assembly as set forth in claim 11 including a spring biasing said piston for drawing fluid into said pumping chamber.

13. An assembly as set forth in claim 12 wherein said pumping chamber includes at least one outlet port.

14. An assembly as set forth in claim 13 wherein said pumping chamber includes at least two outlet ports.

15. An assembly as set forth in claim 14 wherein said pumping chamber includes at least one inlet port.

16. An assembly as set forth in claim 15 wherein said inlet port and said outlet port comprise the same port.

17. An assembly as set forth in claim 14 wherein each of said outlet ports includes an outlet check valve for preventing fluid from entering said chamber through said outlet port.

18. An assembly as set forth in claim 15 wherein each of said inlet ports includes an inlet check valve for preventing fluid from leaving said chamber through said inlet port.

19. An assembly as set forth in claim 13 wherein said inlet port feeds into said chamber through a bypass port and a compensation port, said bypass port being closer to said outlet port than said compensation port.

20. An assembly as set forth in claim 19 wherein said piston includes a washer disposed upon said plunger sealing said chamber for preventing the fluid from leaking past said plunger.

21. An assembly as set forth in claim 20 wherein said piston includes a channel circumscribing said plunger for receiving fluid from said compensation port.

22. An assembly as set forth in claim 11 wherein said spring biases said piston to draw fluid into said chamber.

23. An assembly as set forth in claim 22 wherein said magnetic field biases said piston to pump fluid out of said chamber.

* * * * *